Jan. 18, 1966  E. LARSON ET AL  3,229,609
MULTIPLE AIR SCREEN FOR USE WITH A DOORWAY
Filed Jan. 15, 1964  2 Sheets-Sheet 2
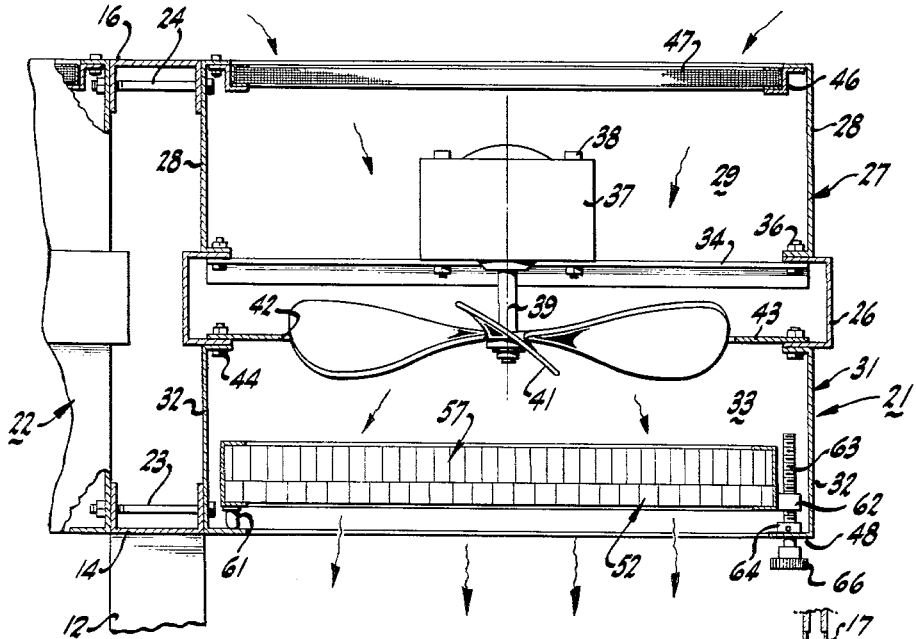
FIG-2
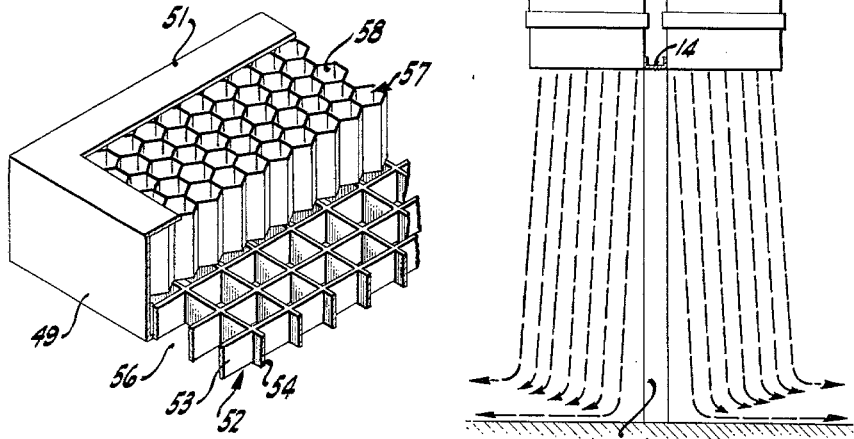
FIG-3
FIG-4
INVENTORS
EUGENE LARSON
STUART PAUL LONDON
BY
ATTORNEYS United States Patent Office 3,229,609
Patented Jan. 18, 1966

3,229,609
MULTIPLE AIR SCREEN FOR USE WITH A
DOORWAY
Eugene Larson, Millbrae, and Stuart Paul London, San Carlos, Calif., assignors to National Industrial Equipment Co., a corporation
Filed Jan. 15, 1964, Ser. No. 337,872
2 Claims. (Cl. 98—36)

The invention relates generally to means, such as shown in Patent 3,086,441, for directing the flow of air downwardly over an open doorway for the purpose of excluding exterior debris and insects, for assisting in retaining within an enclosure the warm or cool air (as the case may be) with which the enclosure is normally supplied, and for permitting continuous use of the doorway for the ingress and egress of people, without discomfort.

In many establishments, such as supermarkets, restaurants, and the like, it is desired to have an attractive and inviting entrance and to permit the passage of patrons through the doorway without the necessity of operating doors either directly or indirectly. Yet, it is necessary to retain within the enclosure the atmospheric condition particularly desired, for example, a cooled interior during hot weather and a warmed interior during cold weather. Also, it is essential, particularly in the case of food establishments, to make sure that exterior flying insects, debris and street dirt cannot enter the premises. It is also essential to avoid air blasts or drafts of such a nature as to disarray the patrons' hair or clothing or to cause other discomfort.

We have found that flying insects of the sort normally guarded against have a fairly well ascertained velocity of flight. They can be diverted from their path of flight by a relatively thin curtain or blanket of air flowing at a high velocity toward the ground. This gives the insect path of flight a downward component so great as to cause collision with the ground or deflection outwardly before the insects can entirely penetrate the air current. We have now found that a similar result can be obtained with a much lower velocity downward air curtain, providing only that the curtain or blanket of air is sufficiently thick and uniform in downward flow so that the downward component, although lesser than in the initial instance, is still sufficient to provide a resultant path which causes collision of the insects with the floor or diversion outwardly before entry of the doorway has been effected.

It is therefore an object of our invention to provide a multiple air screen for use with a doorway in which the downward air current is of a relatively low velocity but of considerable thickness so as to repel invasion of insects and debris from the outside.

Another object of the invention is to provide a multiple air screen for use with a doorway in which a relatively low velocity air curtain is utilized interiorly of the doorway in order to prevent the escape of substantial amounts of interior air to the outside.

A still further object of the invention is to provide a multiple air screen for use with a doorway in which there is provided in the doorway itself a relatively quiescent or dead air space as a transition between the exterior and the interior.

A still further object of the invention is to provide a multiple air screen for use with a doorway arranged so that the weight of the air screen can easily be accommodated on a door frame of a substantially standard sort.

A still further object of the invention is to provide a multiple air screen for use with a doorway in which the air flow is carefully controlled to achieve the result desired and in which the controlling means can be set or varied so as to accommodate the device for use with different doorways and under different conditions of operation.

Another object of the invention is in general to provide an improved multiple air screen for use with doorways.

Other objects together with the foregoing are attained in the embodiment of the invention described in the accompanying description and illustrated in the accompanying drawings, in which:

FIGURE 2 is a cross section on a vertical transverse plane through a portion of a doorway and part of an air screen constructed in accordance with the invention;

FIGURE 3 is a fragmentary isometric view showing an air deflector panel including a panel of hexagonal cellular material and a panel of egg crate material; and FIGURE 4 is a cross section on a vertical plane through a doorway having a multiple air screen installed thereover, all in accordance with our invention.

Figure 1:
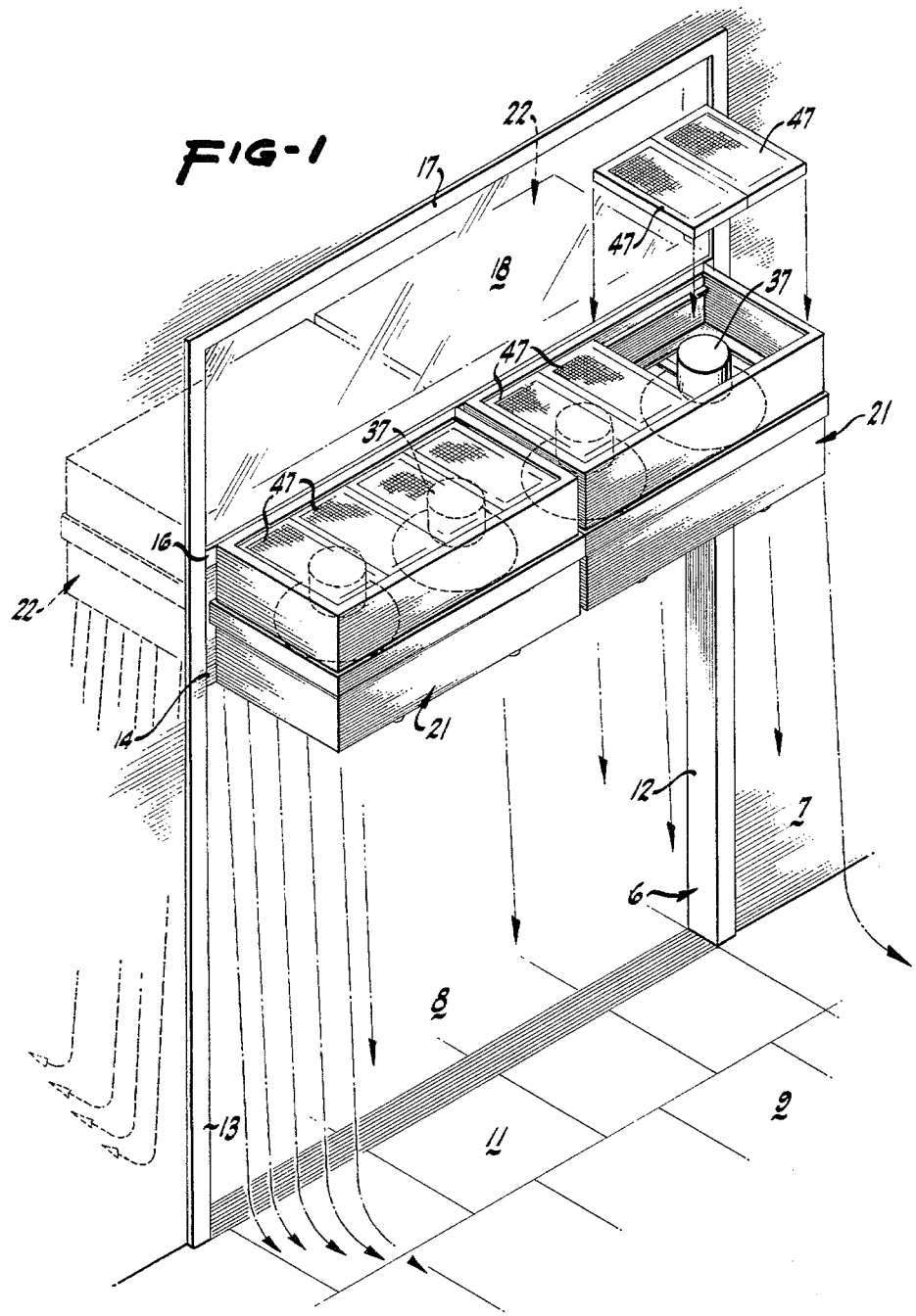
FIGURE 1 is an isometric view from the outside of a doorway constructed pursuant to the invention and having a multiple air screen installed for use therewith.

While the multiple air screen can be installed in many different locations for different purposes, as an example, it is considered herein as being installed in connection with a doorway 6 formed in a vertical wall 7 defining the boundaries of an interior room 8 and an exterior space 9, both having a common floor 11. The doorway 6 is defined by a frame having a pair of upright members 12 and 13 and having a pair of cross members 14 and 16. In the present instance, the door frame also includes a top cross member 17 together with the side members 12 and 13 and the upper cross member 16 defining a transom opening 18 which is preferably closed by glazing.

Pursuant to the invention, a plurality of air screens are mounted on the door frame. There is a pair of exterior screens 21 and a pair of interior screens 22. In the case of a relatively narrow doorway, it is considered expedient to provide only one exterior unit and only one interior unit. All of these screens are identical in their construction and mode of operation, so that a description of one of them applies equally to the others. The exterior and interior screens are preferably supported oppositely each other at the same height on the exterior and interior of the doorway. They are conveniently secured by through fastenings 23 and 24 so that the eccentric loads on the frame members are substantially balanced and constitute only a vertical load without lateral components. It is possible to remove and install any of the air screens individually, thus imposing a temporary unbalanced or asymmetrical load, but for normal operation a balanced load is provided.

In the present instance, one of the exterior units 21, for example, includes a belt frame 26 made up of a number of channel lengths forming an approximate square anud disposed with the flanges inturned. Extending upwardly above the belt frame 26 is an upper housing 27 constituted by four upright walls 28 defining an upper compartment 29. Depending from the belt frame 26 is a lower housing 31 including four walls 32 defining a lower compartment 33. The compartments 29 and 33 communicate with each other through the interior of the belt frame 26.

Spanning the central portion of the belt frame 26 are angle beams 34 appropriately secured in place by fastenings 36 and together serving to support an electric motor 37 held in position by fastenings 38. The motor is normally provided with a depending shaft 39 disposed substantially centrally of the belt frame 26 and carrying a multi-blade fan 41. The fan is disposed within an opening 42 defined by a diaphragm plate 43 which engages all of the bottom flanges of the belt frame 26 and thus closes off the upper compartment 29 from the lower compartment 33 except through the opening 42. The diaphragm plate is held in position by removable fastenings 44.

When the fan motor 37 is energized and the fan 41 is revolved, a current of air is induced to flow in through the upper portion of the compartment 29 past the fan and then outwardly through the open bottom of the housing 31. Preferably, the housing 27 around its upper margin carries Z angles 46 to support a filter panel 47 which is simply rested in position and precludes the passage of relatively large deleterious materials.

Beneath the fan 41 and supported on the inturned lower flanges 48 of the walls 32 of the lower housing 31 is an air deflector frame 49. The air deflector frame is made up of channel members 51 mitered at the corners and secured together to form a relatively stiff and firm support. Resting on the inturned flanges of the frame 49 is a panel 52 of egg crate material. This designation applies to a structure made up of a plurality of intersecting or crossed vertical walls 53 and 54 defining openings 56. The egg crate material is preferably made of metal and has considerable stiffness and supporting strength.

Resting on the egg crate material is a panel 57 of hexagonal cellular material arranged to define through passages 58. The hexagonal cellular material is preferably made of paper or very light metal foil and has but little supporting strength of its own, in fact is inclined to be flexible and to deform. In the present instance, the hexagonal cellular material is well supported on the relatively stiff egg crate material, so that the composite deflector panel enclosed in the deflector frame 49 is a relatively stiff and rigid member.

Pursuant to our invention, the deflector panel 49 along one edge is provided with a plurality of feet 61 resting on the inturned flange of the lower housing 31 and along the other edge is provided with at least one threaded boss 62 with which an adjusting screw stem 63 is engaged. The stem 63 of the adjusting screw has a collar 64 for supporting the screw on the inturned flange 48 of the lower frame and terminates in a thumb wheel 66 for adjustment. When the thumb wheel 66 is turned, the deflector panel 49 is inclined more or less to the horizontal and is usually raised along one side.

Air flowing from the fan not only has its eddy currents damped out and helical swirl removed in passing through the hexagonal cellular material, but also is directed by the egg crate material in such a fashion as to have a component outwardly of the doorway. The net result of this is that the air flow from the fan is not only downwardly across the doorway, but is also directed outwardly thereof substantially as shown in FIGURE 1. Since all of the elements are alike and are disposed with mirror symmetry on the door frame, the effect is to provide on the exterior a downwardly flowing curtain of air having a component away from the door frame or in an exterior direction. When the downwardly and outwardly flowing air strikes the floor or comes near the floor 11, it is deflected almost entirely outwardly. Similarly, the interior units, being symmetrical, force the air downwardly and with an inward current component also away from the door opening. When the interior air strikes the floor or comes near the floor, it is deflected inwardly. The diverging outward curtain of air and inward curtain of air leave a dead air space 74 therebetween.

The total width of downwardly flowing air in the vicinity of the doorway 6 is approximately equal to the total over-all width of both the interior and the exterior air screens, affording a gradual transition from exterior to interior conditions. An insect flying from the outside toward the doorway with a horizontal velocity is urged downwardly toward the floor by air flowing with a sufficient downward component to drive the insect into either the dead air space 74 or preferably to strike the floor before the dead air space is encountered and thus is blown outwardly thereafter. Any conditioned air within the interior space which tends toward the doorway is deflected by the downwardly flowing interior stream and is diverted inwardly along the floor 11 to the interior space. The escape of interior air and the entry of external insects and debris are both precluded.

In any particular installation, by appropriate adjustments of the thumb wheel 66 the deflecting panels can be arranged at appropriate angles so that the air currents flowing downwardly are given appropriate transverse or horizontal components so that the result is to provide a doorway which can be left open without physical barriers and can be readily utilized by people passing therethrough, yet will deflect exterior debris and insects away and will deflect interior conditioned air away. The downward air velocity is insufficient to cause disruption of the hair or attire of users and is not in any way unpleasant.

What is claimed is:
1. A multiple air screen for use with a doorway comprising a frame having a horizontal member extending across the top of said doorway, a pair of substantially identical air moving units, means for mounting said units solely on said frame on opposite sides thereof and extending in opposite directions above said doorway substantially to balance each other and being thereby entirely exposed except for the side of each of said units mounted on said frame, each of said units including a housing closed on the sides and open at the top and at the bottom, a motor within said housing and supported thereon with the shaft of said motor vertical, a fan on said shaft below said motor and effective when said motor is energized to induce air to flow into the top of said housing and to flow out of the bottom of said housing, means on and entirely supported on said housing below said fan for directing air from said fan to flow downwardly on the respective side of said doorway with a component directed away from said doorway, said units being spaced apart on opposite sides of said member to leave a dead air space between the air flowing from said respective units.

2. A multiple air screen as in claim 1 in which said means for directing air is a single panel of egg-crate material extending approximately horizontally over substantially all of the open bottom of the associated air moving unit, and in which said panel is supported in said unit for movement into and out of a horizontal plane.

References Cited by the Examiner

UNITED STATES PATENTS

| | | | |
|---|---|---|---|
| 2,775,187 | 12/1956 | McClurkin | 98—36 |
| 3,086,441 | 4/1963 | London | 98—36 |
| 3,112,686 | 12/1963 | Peterson | 98—36 |
| 3,170,385 | 2/1965 | Tompkins | 98—36 |

WILLIAM F. O'DEA, *Primary Examiner.*

JOHN F. O'CONNOR, *Examiner.*